United States Patent
Takimoto et al.

(10) Patent No.: US 12,235,640 B2
(45) Date of Patent: Feb. 25, 2025

(54) VEHICLE CONTROL DEVICE AND VEHICLE CONTROL METHOD

(71) Applicant: Mitsubishi Electric Corporation, Tokyo (JP)

(72) Inventors: Yasuaki Takimoto, Tokyo (JP); Takuya Kono, Tokyo (JP); Ryo Mizobe, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 144 days.

(21) Appl. No.: 17/772,795

(22) PCT Filed: Jan. 8, 2020

(86) PCT No.: PCT/JP2020/000216
§ 371 (c)(1),
(2) Date: Apr. 28, 2022

(87) PCT Pub. No.: WO2021/140581
PCT Pub. Date: Jul. 15, 2021

(65) Prior Publication Data
US 2022/0342414 A1    Oct. 27, 2022

(51) Int. Cl.
    *G05D 1/00* (2024.01)
(52) U.S. Cl.
    CPC ................. *G05D 1/0011* (2013.01)
(58) Field of Classification Search
    CPC .......................................... G05D 1/0011
    USPC .......................................... 701/2
    See application file for complete search history.

(56) References Cited

U.S. PATENT DOCUMENTS

| | | | |
|---|---|---|---|
| 2017/0248963 A1* | 8/2017 | Levinson | B60W 60/0011 |
| 2017/0270798 A1 | 9/2017 | Ushiba et al. | |
| 2018/0074490 A1* | 3/2018 | Park | G06Q 20/3224 |
| 2019/0202468 A1* | 7/2019 | Kaji | B60W 40/08 |
| 2019/0302756 A1 | 10/2019 | Mori | |
| 2019/0384278 A1* | 12/2019 | Otaka | H04L 67/12 |

(Continued)

FOREIGN PATENT DOCUMENTS

| | | |
|---|---|---|
| JP | 7-311898 A | 11/1995 |
| JP | 2004-295360 A | 10/2004 |

(Continued)

OTHER PUBLICATIONS

Communication dated Aug. 30, 2022, issued in Japanese Application No. 2021-569642.

(Continued)

*Primary Examiner* — Anne Marie Antonucci
*Assistant Examiner* — Luis G Del Valle
(74) *Attorney, Agent, or Firm* — Sughrue Mion, PLLC

(57) ABSTRACT

A resource comparison unit compares a resource list to be used by a control center to remotely operate a remotely driven vehicle with a resource list to be used by a vehicle control unit to control the remotely driven vehicle in accordance with the remote operation from the control center. An alternative resource storage unit stores information on an alternative resource for a resource of the remotely driven vehicle. A resource switching unit switches a resource which is not a commonality and is detected by the resource comparison unit to an alternative resource stored in the alternative resource storage unit.

6 Claims, 7 Drawing Sheets

(56) References Cited

U.S. PATENT DOCUMENTS

2020/0068632 A1* 2/2020 Kato .................... H04W 40/22

FOREIGN PATENT DOCUMENTS

| | | |
|---|---|---|
| JP | 2017-165296 A | 9/2017 |
| JP | 2019-174993 A | 10/2019 |

OTHER PUBLICATIONS

Chinese Office Action issued Jul. 15, 2023, in Application No. 202080090228.8.
Chinese Office Action issued Apr. 3, 2024 in Application No. 202080090228.8.
International Search Report of PCT/JP2020/000216 dated Mar. 17, 2020 [PCT/ISA/210].

* cited by examiner

FIG. 2A

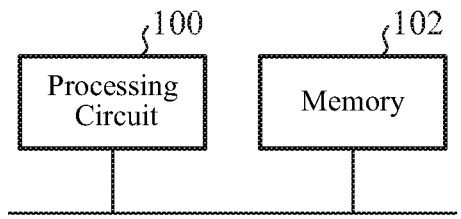

FIG. 2B

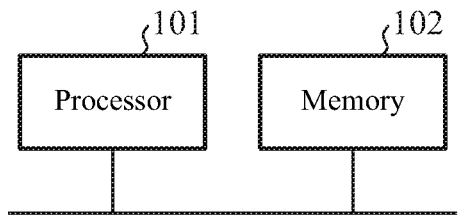

FIG. 3

(1) Center Functional Definition: Remote Driving Function (Essential Function)

Reliance Function List: NA

Reliance Resource List

| Provider | Resource |
|---|---|
| Vehicle | Front Camera Image |
| Vehicle | Rear Camera Image |
| Vehicle | Vehicle Speed |
| Vehicle | Vehicle Position Information |

Provision Resource List

| Provider | Resource |
|---|---|
| Center | Accelerator Instruction |
| Center | Brake Instruction |

FIG. 4

(2) Center Resource List

| Provider | Resource | State |
|---|---|---|
| Center | Accelerator Instruction | Effective |
| Center | Brake Instruction | Effective |
| ... | ... | ... |

FIG. 5

(3) Vehicle Functional Definition: Remote Driving Function (Essential Function)

Reliance Function List

| Function |
|---|
| Camera Image Input Function |

Reliance Resource List

| Provider | Resource |
|---|---|
| Center | Accelerator Instruction |
| Center | Brake Instruction |

Provision Resource List

| Provider | Resource |
|---|---|
| Vehicle | Vehicle Speed |
| Vehicle | Vehicle Position Information |

FIG. 6

(4) Vehicle Functional Definition: Camera Image Input Function

Reliance Function List: NA

Reliance Resource List: NA

Provision Resource List

| Provider | Resource |
|---|---|
| Vehicle | Front Camera Image |
| Vehicle | Rear Camera Image |

FIG. 7

(5) Vehicle Resource List

| Provider | Resource | State |
|---|---|---|
| Vehicle | Front Camera Image | Effective |
| Vehicle | Rear Camera Image | Effective |
| Vehicle | Vehicle Speed | Unusable |
| Vehicle | Vehicle Position Information | Effective |
| ... | ... | ... |

FIG. 8

(6) Alternative Resource: Vehicle Speed Estimated from Camera Image

Reliance Function List: NA

Reliance Resource List

| Provider | Resource |
|---|---|
| Vehicle | Front Camera Image |

Provision Resource List

| Provider | Resource | Reliability |
|---|---|---|
| Vehicle | Vehicle Speed Estimated from Camera Image | 90% |

FIG. 9

(7) Center Functional Definition: Remote Driving Function (Essential Function):
Resource Comparison Result: Insufficient Reliance Function List: NA Reliance Resource List

| Provider | Resource | State |
|---|---|---|
| Vehicle | Front Camera Image | Effective |
| Vehicle | Rear Camera Image | Effective |
| Vehicle | Vehicle Speed | Unusable |
| Vehicle | Vehicle Position Information | Effective |

Provision Resource List

| Provider | Resource | State |
|---|---|---|
| Center | Accelerator Instruction | Effective |
| Center | Brake Instruction | Effective |

FIG. 10

(8) Vehicle Functional Definition: Remote Driving Function (Essential Function):
Resource Comparison Result: Sufficient Reliance Function List

| Function | State |
|---|---|
| Camera Image Input Function | Effective |

Reliance Resource List

| Provider | Resource | State |
|---|---|---|
| Center | Accelerator Instruction | Effective |
| Center | Brake Instruction | Effective |

Provision Resource List

| Provider | Resource | State |
|---|---|---|
| Vehicle | Vehicle Speed | Unusable |
| Vehicle | Vehicle Position Information | Effective |
| Vehicle | Front Camera Image | Effective |
| Vehicle | Rear Camera Image | Effective |

FIG. 11

(9) Center Functional Definition: Remote Driving Function (Essential Function):
Resource Comparison Result: Sufficient (90%)

Reliance Function List: NA

Reliance Resource List

| Provider | Resource | State |
|---|---|---|
| Vehicle | Front Camera Image | Effective |
| Vehicle | Rear Camera Image | Effective |
| Vehicle | Vehicle Speed Estimated from Camera Image | Effective (90%) |
| Vehicle | Vehicle Position Information | Effective |

Provision Resource List

| Provider | Resource | State |
|---|---|---|
| Center | Accelerator Instruction | Effective |
| Center | Brake Instruction | Effective |

FIG. 12

(10) Vehicle Functional Definition: Remote Driving Function (Essential Function): Resource Comparison Result: Sufficient Reliance Function List

| Function | State |
|---|---|
| Camera Image Input Function | Effective |

Reliance Resource List

| Provider | Resource | State |
|---|---|---|
| Center | Accelerator Instruction | Effective |
| Center | Brake Instruction | Effective |

Provision Resource List

| Provider | Resource | State |
|---|---|---|
| Vehicle | Vehicle Speed Estimated from Camera Image | Effective (90%) |
| Vehicle | Vehicle Position Information | Effective |
| Vehicle | Front Camera Image | Effective |
| Vehicle | Rear Camera Image | Effective |

VEHICLE CONTROL DEVICE AND VEHICLE CONTROL METHOD

CROSS REFERENCE TO RELATED APPLICATIONS

This application is a National Stage of International Application No. PCT/JP2020/000216 filed on Jan. 8, 2020.

TECHNICAL FIELD

The present disclosure relates to a vehicle control device and a vehicle control method.

BACKGROUND ART

Conventionally, a technique for controlling a vehicle by remote operation performed by an operator in a control center has been proposed (see, for example, Patent Literature 1).

CITATION LIST

Patent Literatures

Patent Literature 1: JP 2004-295360 A

SUMMARY OF INVENTION

Technical Problem

In the conventional technique as described in Patent Literature 1, since the control center and the vehicle are configured as a uniform system, resources that can be used for the remote operation by the control center and the vehicle are only those determined in advance. However, for example, when the control center includes a plurality of service providers, there is a possibility that the resources that can be used for the remote operation are different for each service provider. In addition, when types of vehicles to be remotely operated are different, when equipment is different even in the same type of vehicle, or when the equipment is unusable due to a failure or the like, there is a possibility that the resources that can be used for the remote operation are different for each type of vehicle or for each vehicle. In the conventional technique, when there are variations in the resources that can be used for the remote operation by the control center and the vehicle due to the above reasons, the vehicle cannot be controlled by the remote operation in some cases.

The present disclosure has been made to solve the above problem, and an object thereof is to provide a vehicle control device capable of controlling a vehicle by remote operation even when there are variations in resources that can be used for the remote operation by a control center and the vehicle.

Solution to Problem

A vehicle control device according to the present disclosure is a vehicle control device to control a vehicle in accordance with remote operation from a control center, the vehicle control device including: a memory to store information on one or more alternative resources for at least one resource of the vehicle; and processing circuitry to acquire a first resource list to be used by the control center to remotely operate the vehicle; to acquire a second resource list to be used by the vehicle control device to control the vehicle in accordance with the remote operation from the control center; to compare the first resource list acquired with the second resource list acquired; and to switch, when detecting a resource which is not a commonality between the first resource list acquired and the second resource list acquired, the resource which is not the commonality to a corresponding one of the one or more alternative resources stored in the memory.

Advantageous Effects of Invention

According to the present disclosure, switching to the alternative resource is performed when a resource which the control center wants and the resource of the vehicle do not match. Therefore, even when there are variations in resources that can be used for the remote operation by the control center and the vehicle, the vehicle can be controlled by the remote operation.

BRIEF DESCRIPTION OF DRAWINGS

FIGS. 2A and 2B are diagrams each illustrating a hardware configuration example of a vehicle control device according to the first embodiment.

FIG. 3 is a table illustrating a remote driving function which is one of center functional definitions.

FIG. 4 is a table illustrating an example of a center resource list.

FIG. 5 is a table illustrating a remote driving function which is one of vehicle functional definitions.

FIG. 6 is a table illustrating a camera image input function which is one of the vehicle functional definitions.

FIG. 7 is a table illustrating an example of a vehicle resource list.

FIG. 8 is a table illustrating an example of an alternative resource stored in an alternative resource storage unit.

FIG. 9 is a table illustrating a resource comparison result of the remote driving function which is an essential function of the center functional definition.

FIG. 10 is a table illustrating a resource comparison result of the remote driving function which is an essential function of the vehicle functional definition.

FIG. 11 is a table in which a resource "vehicle speed" of the remote driving function which is the essential function of the center functional definition is switched to an alternative resource "vehicle speed estimated from camera image".

FIG. 12 is a table in which a resource "vehicle speed" of the remote driving function which is the essential function of the vehicle functional definition is switched to the alternative resource "vehicle speed estimated from camera image".

DESCRIPTION OF EMBODIMENTS

Hereinafter, in order to explain the present disclosure in more detail, an embodiment for carrying out the present disclosure will be described with reference to the accompanying drawings.

First Embodiment

Figure 1:
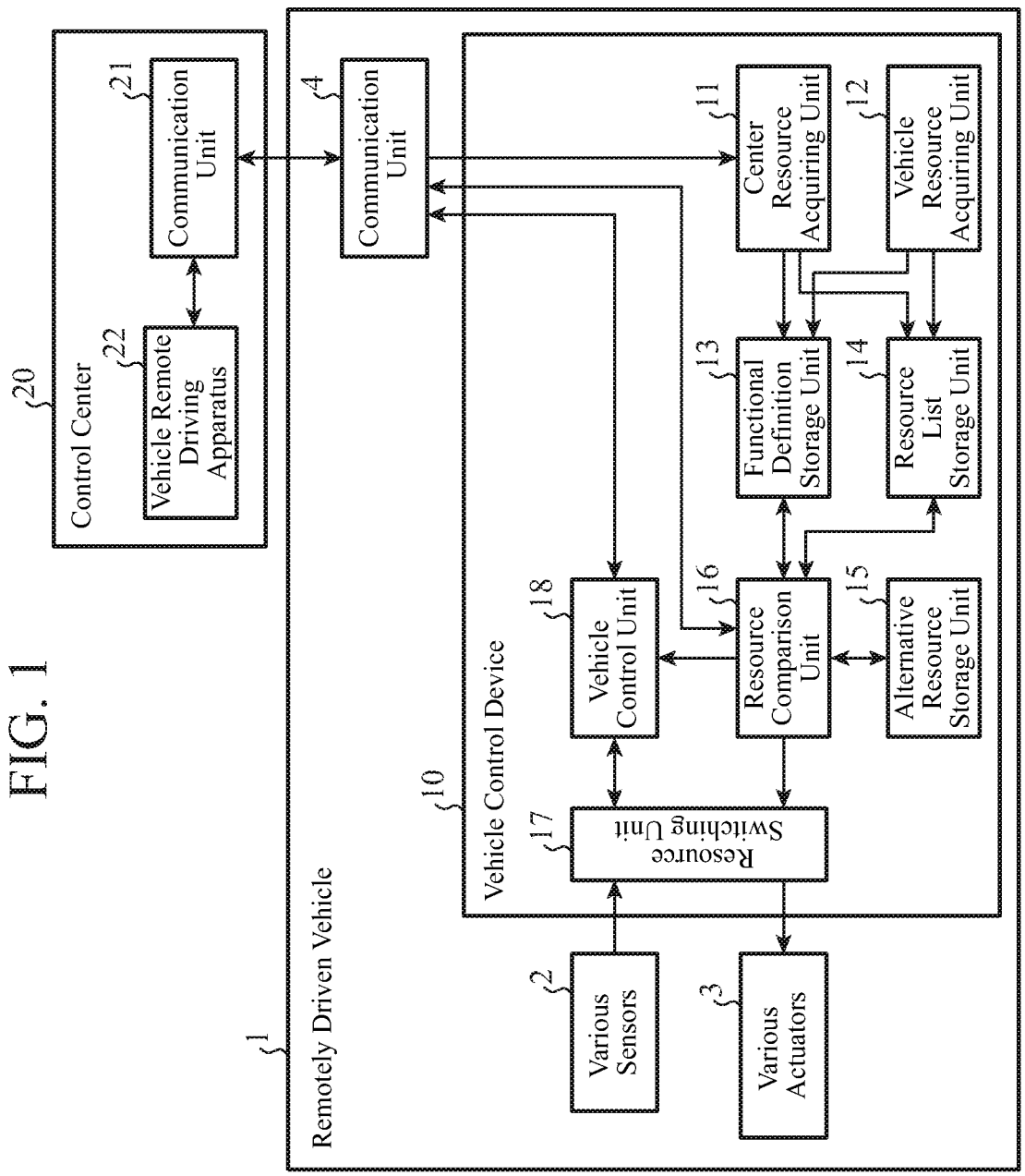
FIG. 1 is a block diagram illustrating a configuration example of a vehicle control system according to a first embodiment.

FIG. 1 is a block diagram illustrating a configuration example of a vehicle control system according to a first embodiment. The vehicle control system mainly includes a vehicle control device 10 mounted on a remotely driven vehicle 1 and a control center 20 that remotely operates the remotely driven vehicle 1 from a distant place. This vehicle control device 10 controls the remotely driven vehicle 1 in accordance with remote operation from the control center 20. The vehicle control device 10 includes a center resource acquiring unit 11, a vehicle resource acquiring unit 12, a functional definition storage unit 13, a resource list storage unit 14, an alternative resource storage unit 15, a resource comparison unit 16, a resource switching unit 17, and a vehicle control unit 18. The control center 20 includes a communication unit 21 and a vehicle remote driving apparatus 22.

First, a hardware configuration of the vehicle control device 10 will be described.

FIGS. 2A and 2B are diagrams each illustrating a hardware configuration example of the vehicle control device 10 according to the first embodiment. Functions of the center resource acquiring unit 11, the vehicle resource acquiring unit 12, the resource comparison unit 16, the resource switching unit 17, and the vehicle control unit 18 in the vehicle control device 10 are implemented by a processing circuit. In other words, the vehicle control device 10 includes a processing circuit for implementing the above functions. The processing circuit may be a processing circuit 100 as dedicated hardware, or may be a processor 101 that executes a program stored in a memory 102. Further, functions of the functional definition storage unit 13, the resource list storage unit 14, and the alternative resource storage unit 15 in the vehicle control device 10 are implemented by the memory 102.

As illustrated in FIG. 2A, when the processing circuit is dedicated hardware, the processing circuit 100 corresponds to, for example, a single circuit, a composite circuit, a programmed processor, a parallel programmed processor, an application specific integrated circuit (ASIC), a field programmable gate array (FPGA), or a combination thereof. The functions of the center resource acquiring unit 11, the vehicle resource acquiring unit 12, the resource comparison unit 16, the resource switching unit 17, and the vehicle control unit 18 may be implemented by a plurality of processing circuits 100, or the functions of the respective units may be collectively implemented by one processing circuit 100.

As illustrated in FIG. 2B, when the processing circuit is the processor 101, the functions of the center resource acquiring unit 11, the vehicle resource acquiring unit 12, the resource comparison unit 16, the resource switching unit 17, and the vehicle control unit 18 are implemented by software, firmware, or a combination of software and firmware. The software or firmware is described as a program and stored in the memory 102. The processor 101 implements the function of each unit by reading and executing the program stored in the memory 102. That is, the vehicle control device 10 includes the memory 102 for storing a program that, when executed by the processor 101, results in execution of steps illustrated in a flowchart of FIG. 13 to be described later. Further, it can also be said that this program causes a computer to execute a procedure or a method performed by the center resource acquiring unit 11, the vehicle resource acquiring unit 12, the resource comparison unit 16, the resource switching unit 17, and the vehicle control unit 18.

Here, the processor 101 is a central processing unit (CPU), a processing device, an arithmetic device, a microprocessor, or the like.

The memory 102 may be a nonvolatile or volatile semiconductor memory such as a random access memory (RAM), a read only memory (ROM), an erasable programmable ROM (EPROM), or a flash memory, may be a magnetic disk such as a hard disk or a flexible disk, or may be an optical disk such as a compact disc (CD) or a digital versatile disc (DVD).

Note that a part of the functions of the center resource acquiring unit 11, the vehicle resource acquiring unit 12, the resource comparison unit 16, the resource switching unit 17, and the vehicle control unit 18 may be implemented by dedicated hardware, and a part thereof may be implemented by software or firmware. As described above, the processing circuit in the vehicle control device 10 can implement the above-described functions by hardware, software, firmware, or a combination thereof.

Next, details of the vehicle control system illustrated in FIG. 1 will be described.

In the control center 20, there is an operator (not illustrated) who operates the vehicle remote driving apparatus 22. The vehicle remote driving apparatus 22 includes, for example, a driver's seat, an accelerator, a brake, a steering, meters, and a display device. The communication unit 21 of the control center 20 and a communication unit 4 of the remotely driven vehicle 1 exchange information by wireless communication. The communication unit 21 receives information on resources such as a vehicle speed and vehicle position information provided from the remotely driven vehicle 1. On the basis of the resources provided from the remotely driven vehicle 1 received by the communication unit 21, the vehicle remote driving apparatus 22 controls, for example, the meters, and displays a map indicating a position of the remotely driven vehicle 1 on the display device. The operator operates the accelerator, the brake, the steering, and the like while watching the meters and the display device. The vehicle remote driving apparatus 22 generates remote operation information including an accelerator instruction, a brake instruction, and the like on the basis of operation performed by the operator. The communication unit 21 transmits the remote operation information generated by the vehicle remote driving apparatus 22 to the remotely driven vehicle 1. The accelerator instruction, the brake instruction, and the like correspond to resources provided by the control center 20 to the vehicle control device 10 (also referred to as center resources).

Various sensors 2, various actuators 3, and the communication unit 4 mounted on the remotely driven vehicle 1 are connected to the vehicle control device 10. The various sensors 2 are a front camera that images an area in front of the remotely driven vehicle 1, a rear camera that images an area behind the remotely driven vehicle 1, a sensor that detects a vehicle speed of the remotely driven vehicle 1 (hereinafter, referred to as a vehicle speed sensor), a sensor that detects a position of the remotely driven vehicle 1, and the like. A front camera image, a rear camera image, the vehicle speed, vehicle position information, and the like correspond to resources provided by the vehicle control device 10 to the control center 20 (also referred to as vehicle resources). The various actuators 3 are, for example, an actuator that controls an accelerator of the remotely driven vehicle 1, an actuator that controls a brake of the remotely driven vehicle 1, and the like.

The center resource acquiring unit 11 acquires, from the control center 20 via the communication unit 4, functional definition information in which functions that can be executed by the vehicle remote driving apparatus 22 of the control center 20 are defined, and information indicating the center resources of the control center 20 and a state of each center resource. Note that the functions that can be executed by the vehicle remote driving apparatus 22 of the control center 20 include at least a remote driving function for remotely operating the remotely driven vehicle 1. The center resource acquiring unit 11 stores the functional definition information in the functional definition storage unit 13 as a center functional definition. In addition, the center resource acquiring unit 11 stores the information indicating the center resources and the state of each center resource in the resource list storage unit 14 as a center resource list.

FIG. 3 is a table illustrating a remote driving function which is one of center functional definitions. This remote driving function is acquired by the center resource acquiring unit 11 from the control center 20 and stored in the functional definition storage unit 13. A reliance function list is information indicating functions necessary for the control center 20 to execute the remote driving function. A reliance resource list is a list in which resources necessary for the control center 20 to execute the remote driving function are written, and a provider for each resource is written. "Vehicle" in the provider is the remotely driven vehicle 1. A provision resource list is a list in which resources to be provided for the remotely driven vehicle 1 by the control center 20 to execute the remote driving function are written, and a provider for each resource is written. "Center" in the provider is the control center 20.

FIG. 4 is a table illustrating an example of a center resource list. This center resource list is acquired by the center resource acquiring unit 11 from the control center 20 and stored in the resource list storage unit 14. According to this list, the control center 20 has resources such as an accelerator instruction and a brake instruction. Further, each resource of the control center 20 is currently in an effective state.

The vehicle resource acquiring unit 12 acquires, for example, from the various sensors 2 and the various actuators 3, functional definition information in which functions that can be executed by the remotely driven vehicle 1 are defined, and information indicating the vehicle resources of the remotely driven vehicle 1 and a state of each vehicle resource. Note that the functions that can be executed by the remotely driven vehicle 1 include at least a remote driving function for controlling the remotely driven vehicle 1 in accordance with remote operation from the control center 20. The vehicle resource acquiring unit 12 stores the functional definition information in the functional definition storage unit 13 as a vehicle functional definition. In addition, the vehicle resource acquiring unit 12 stores the information indicating the vehicle resources and the state of each vehicle resource in the resource list storage unit 14 as a vehicle resource list.

Note that the vehicle functional definition may be stored in advance in the functional definition storage unit 13.

FIG. 5 is a table illustrating a remote driving function which is one of vehicle functional definitions. FIG. 6 is a table illustrating a camera image input function which is one of the vehicle functional definitions. The remote driving function of FIG. 5 and the camera image input function of FIG. 6 are acquired by the vehicle resource acquiring unit 12 from the various sensors 2, the various actuators 3, and the like and stored in the functional definition storage unit 13, or stored in advance in the functional definition storage unit 13. A reliance function list is information indicating functions necessary for the vehicle control device 10 to execute the remote driving function. In the example of FIG. 5, "camera image input function" is described as a reliance function of the remote driving function. The reliance function "camera image input function" in FIG. 5 is the camera image input function illustrated in FIG. 6. In FIGS. 5 and 6, reliance resource lists are lists in which resources necessary for the vehicle control device 10 to execute the remote driving function and the camera image input function are written, and a provider for each resource is written. "Center" in the provider is the control center 20. In FIGS. 5 and 6, provision resource lists are lists in which resources to be provided by the vehicle control device 10 to execute the remote driving function and the camera image input function are written, and a provider for each resource is written. "Vehicle" in the provider is the remotely driven vehicle 1.

FIG. 7 is a table illustrating an example of a vehicle resource list. This vehicle resource list is acquired by the vehicle resource acquiring unit 12 from the various sensors 2, the various actuators 3, and the like and stored in the resource list storage unit 14. According to this list, the remotely driven vehicle 1 has resources such as a front camera image, a rear camera image, a vehicle speed, and vehicle position information. In addition, the front camera image, the rear camera image, and the vehicle position information, which are the resources of the remotely driven vehicle 1, are currently in effective states. On the other hand, the vehicle speed, which is the resource of the remotely driven vehicle 1, is in an unusable state. This is because the vehicle speed sensor of the remotely driven vehicle 1 cannot be currently used due to a failure, bad weather, or the like.

The alternative resource storage unit 15 stores information indicating an alternative resource for the resource of the remotely driven vehicle 1. When there is a plurality of alternative resources for one resource, a priority may be given to each of the plurality of alternative resources.

Note that, as will be described later, the alternative resource storage unit 15 may store information indicating an alternative resource for the resource of the control center 20 in addition to the information indicating the alternative resource for the resource of the remotely driven vehicle 1.

FIG. 8 is a table illustrating an example of the alternative resource stored in the alternative resource storage unit 15. In this example, the alternative resource storage unit 15 stores information on "vehicle speed estimated from camera image" as an alternative resource for "vehicle speed" which is one of the vehicle resources. A method of estimating the vehicle speed from the camera image is, for example, a method of extracting a road surface from the front camera image, estimating a moving speed of the remotely driven vehicle 1 on the basis of a movement locus of a feature point on the extracted road surface and elapsed time, and using the estimated moving speed as the vehicle speed.

Although not illustrated, the alternative resource for "vehicle speed" is not limited to "vehicle speed estimated from camera image", and may be "vehicle speed estimated from acceleration sensor", "vehicle speed estimated from vehicle position information", or the like.

Note that, since the alternative resource is not an original vehicle resource, there is a possibility that reliability is lower than that of the original vehicle resource. In the example of FIG. 8, when reliability of the vehicle speed detected by the vehicle speed sensor is 100%, reliability of the vehicle speed estimated from the camera image is 90%, and thus reliability of the alternative resource "vehicle speed estimated from camera image" is defined as "90%". This reliability may be used as priority of the alternative resource. Here, the higher a value of the reliability, the higher the priority.

The resource comparison unit 16 acquires the center functional definition and the vehicle functional definition stored in the functional definition storage unit 13 and the center resource list and the vehicle resource list stored in the resource list storage unit 14. By comparing the acquired center functional definition, vehicle functional definition, center resource list, and vehicle resource list, the resource comparison unit 16 determines whether or not the resource described in the remote driving function which is an essential function of the center functional definition is satisfied and whether or not the resource described in the remote driving function which is an essential function of the vehicle functional definition is satisfied.

FIG. 9 is a table illustrating a resource comparison result of the remote driving function which is the essential function of the center functional definition. The resource comparison unit 16 checks whether or not a function corresponding to a reliance function described in the remote driving function, which is the essential function of the center functional definition, is stored in the functional definition storage unit 13. In addition, the resource comparison unit 16 checks whether or not resources corresponding to a reliance resource and a provision resource described in this remote driving function are stored in the resource list storage unit 14. In addition, the resource comparison unit 16 refers to the resource list storage unit 14 and thereby checks a state of each of the reliance resource and the provision resource described in this remote driving function. Then, the resource comparison unit 16 updates the information on the remote driving function illustrated in FIG. 3 to information on the remote driving function illustrated in FIG. 9 on the basis of the check result. In addition, when each reliance resource described in the remote driving function is stored in the resource list storage unit 14 and when the state of each reliance resource is effective, the resource comparison unit 16 sets the resource comparison result to "sufficient", and otherwise, sets the resource comparison result to "insufficient". In the example of FIG. 9, since "vehicle speed" of the reliance resources is in an "unusable" state due to a failure of the vehicle speed sensor or the like, the resource comparison result is "insufficient".

FIG. 10 is a table illustrating a resource comparison result of the remote driving function which is the essential function of the vehicle functional definition. The resource comparison unit 16 checks whether or not a function corresponding to a reliance function described in the remote driving function, which is the essential function of the vehicle functional definition, is stored in the functional definition storage unit 13. In addition, the resource comparison unit 16 checks whether or not resources corresponding to reliance resource and a provision resource described in this remote driving function are stored in the resource list storage unit 14. In addition, the resource comparison unit 16 refers to the resource list storage unit 14 and thereby checks a state of each of the reliance resource and the provision resource described in this remote driving function. Then, the resource comparison unit 16 updates the information on the remote driving function illustrated in FIG. 5 to information on the remote driving function illustrated in FIG. 10 on the basis of the check result. At that time, the resource comparison unit 16 adds the provision resources "front camera image" and "rear camera image" described in "camera image input function" which is the reliance function of the remote driving function (see FIG. 6) to the provision resource of the remote driving function in FIG. 10. In addition, when each reliance resource described in the remote driving function is stored in the resource list storage unit 14 and when the state of each reliance resource is effective, the resource comparison unit 16 sets the resource comparison result to "sufficient", and otherwise, sets the resource comparison result to "insufficient". In the example of FIG. 10, since the states of all the reliance resources are "effective", the resource comparison result is "sufficient".

Note that, in each of the examples of FIGS. 9 and 10, all the reliance resources described in the remote driving function are stored in the resource list storage unit 14, but there may be a case where some of the reliance resources described in the remote driving function are not stored in the resource list storage unit 14. This is because when equipment is different for each type of the remotely driven vehicle 1, or when the equipment is different even for the same vehicle type, the resource is different for each of the remotely driven vehicles 1. For example, when the rear camera is not installed in the remotely driven vehicle 1, "rear camera image" does not exist in the vehicle resource list of the resource list storage unit 14. In that case, since "rear camera image" of the reliance resource described in the remote driving function illustrated in FIG. 9 is not stored in the resource list storage unit 14, the resource comparison unit 16 sets the resource comparison result to "insufficient".

The resource comparison unit 16 switches a resource not stored in the resource list storage unit 14 among the resources described in the remote driving function which is the essential function to an alternative resource stored in the alternative resource storage unit 15. In addition, the resource comparison unit 16 switches a resource in an unusable state among the resources described in the remote driving function which is the essential function to an alternative resource stored in the alternative resource storage unit 15.

FIG. 11 is a table in which a resource "vehicle speed" of the remote driving function which is the essential function of the center functional definition is switched to an alternative resource "vehicle speed estimated from camera image". FIG. 12 is a table in which the resource "vehicle speed" of the remote driving function which is the essential function of the vehicle functional definition is switched to the alternative resource "vehicle speed estimated from camera image". The resource comparison unit 16 replaces the resource "vehicle speed" in the unusable state described in the remote driving function illustrated in each of FIGS. 9 and 10 with the alternative resource "vehicle speed estimated from camera image" stored in the alternative resource storage unit 15, thereby achieving an update to information on the remote driving function of each of FIGS. 11 and 12. In the alternative resource illustrated in FIG. 8, "front camera image" is described as the reliance resource, and this "front camera image" is in an effective state according to the vehicle resource list illustrated in FIG. 7. Therefore, the resource comparison unit 16 updates a state of the alternative resource "vehicle speed estimated from camera image" illustrated in FIGS. 11 and 12 to "effective". In addition, the resource comparison unit 16 updates the resource comparison result "insufficient" illustrated in FIG. 9 to a resource comparison result "sufficient (90%)" illustrated in FIG. 11. This "90%" is reliability of the remote driving function based on reliability "90%" of the alternative resource "vehicle speed estimated from camera image".

Note that any method of selecting the alternative resource is used.

For example, when there is a plurality of alternative resources corresponding to the original resource "vehicle speed" including "vehicle speed estimated from camera image", the resource comparison unit 16 selects, for example, an alternative resource having the highest reliability, that is, an alternative resource having the highest priority from among the plurality of alternative resources.

Furthermore, for example, the resource comparison unit 16 may transmit information on a plurality of alternative resources and reliability to the control center 20 via the communication unit 4, and thereby cause an operator of the vehicle remote driving apparatus 22 to select an alternative resource. The vehicle remote driving apparatus 22 returns information on the alternative resource selected by the operator to the remotely driven vehicle 1 via the communication unit 21. The resource comparison unit 16 acquires the information on the alternative resource selected by the operator via the communication unit 4.

When causing the operator to select the alternative resource, the resource comparison unit 16 may present, to the operator, only an alternative resource whose reliability is equal to or more than a predetermined threshold among the plurality of alternative resources.

Furthermore, for example, when a plurality of resources is in an unusable state among the resources described in the remote driving function, the resource comparison unit 16 selects an alternative resource having the highest reliability for each of the plurality of resources.

Alternatively, the resource comparison unit 16 may calculate a predetermined evaluation function using the reliabilities of the alternative resources for the respective plurality of resources, and select a combination of the alternative resources so that an evaluation score that is a result of the calculation is equal to or more than a predetermined score.

Furthermore, for example, the resource comparison unit 16 may change the reliability (that is, the priority) of the alternative resource stored in the alternative resource storage unit 15 depending on a condition of the outside or the like. For example, in a case of poor visibility such as rainy weather and nighttime, there is a possibility that quality of the front camera image deteriorates. Therefore, the resource comparison unit 16 lowers the reliability of the alternative resource "vehicle speed estimated from camera image". A condition for changing the reliability is predetermined in the resource comparison unit 16.

In addition, for example, when there is no alternative resource for the resource in the unusable state in the alternative resource storage unit 15, the resource comparison unit 16 may transmit information to the effect that there is no alternative resource to the control center 20 via the communication unit 4 and thereby cause the operator of the vehicle remote driving apparatus 22 to select whether or not to perform remote operation of the remotely driven vehicle 1. As a result, the control center 20 may be able to perform remote operation under an adverse condition in which there is no alternative resource.

The resource comparison unit 16 notifies the resource switching unit 17 of information on the alternative resource among the reliance resources and the provision resources described in the remote driving function which is the essential function of the vehicle functional definition, together with information on the original resource. In addition, the resource comparison unit 16 notifies the vehicle control unit 18 of information on resources other than the alternative resource among the reliance resources and the provision resources described in the remote driving function which is the essential function of the vehicle functional definition.

At this time, the resource comparison unit 16 may notify the operator of the vehicle remote driving apparatus 22 of the reliability of the remote driving function which is the essential function of the center functional definition, by transmitting the updated information on the remote driving function to the control center 20 via the communication unit 4.

The resource switching unit 17 outputs various resources input from the various sensors 2 to the vehicle control unit 18. At that time, the resource switching unit 17 outputs the alternative resource notified from the resource comparison unit 16 to the vehicle control unit 18 instead of the original resource. The vehicle control unit 18 acquires, from the various sensors 2 via the resource switching unit 17, the resources other than the alternative resource notified from the resource comparison unit 16, acquires the alternative resource from the resource switching unit 17, and transmits these acquired resources to the control center 20 via the communication unit 4.

For example, in the remote driving function illustrated in FIG. 12, "vehicle speed" which is the original resource is switched to "vehicle speed estimated from camera image" which is the alternative resource. Therefore, the resource switching unit 17 estimates a vehicle speed by using the resource "front camera image" input from the front camera of the various sensors 2, and outputs the estimated vehicle speed to the vehicle control unit 18 instead of the resource "vehicle speed" input from the vehicle speed sensor of the various sensors 2.

In addition, the vehicle control unit 18 acquires the remote operation information transmitted by the control center 20 via the communication unit 4 and outputs the information to the resource switching unit 17. Resources included in the remote operation information correspond to the reliance resources described in the remote driving function which is the essential function of the vehicle functional definition. The resource switching unit 17 outputs the alternative resource notified from the resource comparison unit 16 among the resources included in the remote operation information to the various actuators 3 instead of the original resource, and outputs the resources other than the alternative resource notified from the resource comparison unit 16 to the various actuators 3 as they are.

For example, in the remote driving function which is the essential function of the center functional definition illustrated in FIG. 3, it is assumed that there is no provision resource "accelerator instruction" and there is instead a provision resource "throttle opening instruction". In addition, here, the alternative resource storage unit 15 stores not only information on the alternative resource for the resource of the remotely driven vehicle 1 but also information on the alternative resource for the resource of the control center 20. In this example, the resource comparison unit 16 refers to the alternative resource storage unit 15 to switch the reliance resource "accelerator instruction" described in the remote driving function which is the essential function of the vehicle functional definition illustrated in FIG. 5 to the alternative resource "throttle opening instruction". The resource switching unit 17 converts the throttle opening instruction received from the control center 20 into an accelerator instruction using a predetermined conversion formula or the like, and outputs the converted accelerator instruction to the various actuators 3. As a result, even when the control center 20 includes a plurality of service providers and resources that can be used for remote operation are different for each service provider, the vehicle control device 10 can control the remotely driven vehicle 1.

Next, operation of the vehicle control device 10 will be described.

Figure 13:
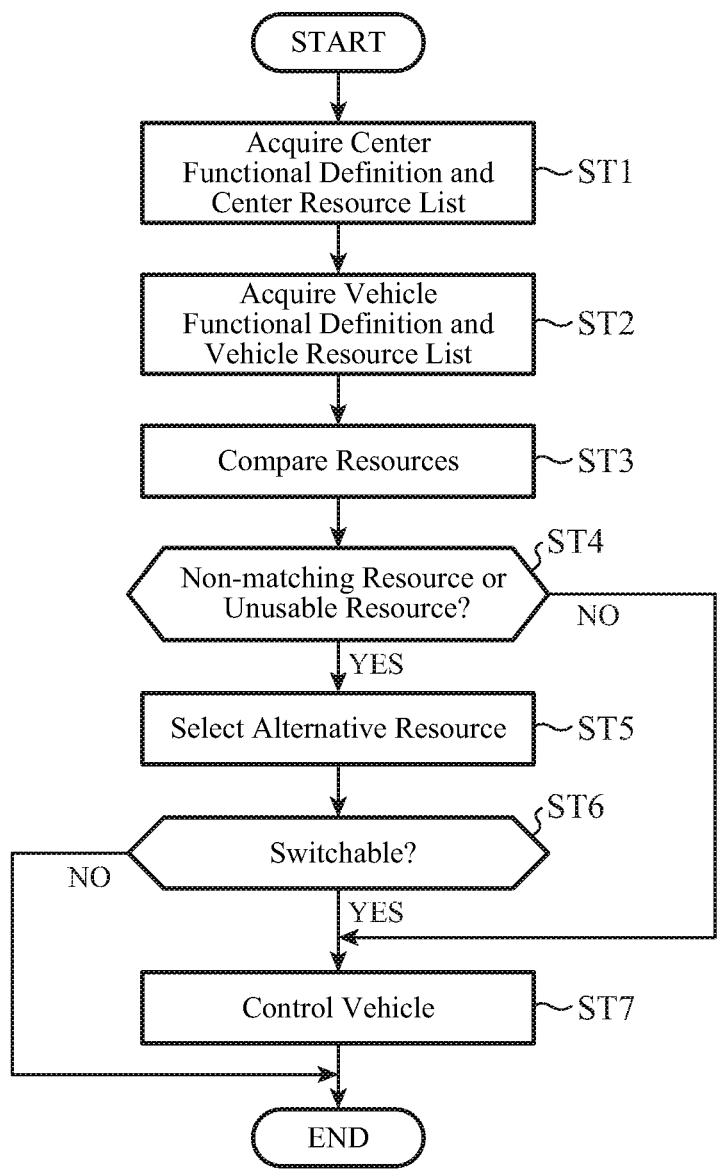
FIG. 13 is a flowchart showing an operation example of the vehicle control device according to the first embodiment.

FIG. 13 is a flowchart illustrating an operation example of the vehicle control device 10 according to the first embodiment. For example, when a driver of the remotely driven vehicle 1 requests the vehicle control device 10 to start remote driving, the vehicle control device 10 starts operation illustrated in the flowchart of FIG. 13. Thereafter, the vehicle control device 10 repeats the operation illustrated in the flowchart of FIG. 13 at predetermined intervals until the driver requests to end the remote driving.

In step ST1, the center resource acquiring unit 11 acquires, from the control center 20 via the communication unit 4, a center functional definition and a center resource list, which correspond to a resource list to be used by the control center 20 to remotely operate the remotely driven vehicle 1, and stores them in the functional definition storage unit 13 and the resource list storage unit 14. In step ST2, the vehicle resource acquiring unit 12 acquires, from the remotely driven vehicle 1, a vehicle functional definition and a vehicle resource list, which correspond to a resource list to be used by the vehicle control unit 18 to control the remotely driven vehicle 1 in accordance with the remote operation from the control center 20, and stores them in the functional definition storage unit 13 and the resource list storage unit 14.

In step ST3, by comparing the acquired center functional definition, vehicle functional definition, center resource list, and vehicle resource list, the resource comparison unit 16 determines whether or not the resource described in the remote driving function which is an essential function of the center functional definition is satisfied and whether or not the resource described in the remote driving function which is an essential function of the vehicle functional definition is satisfied.

Further, if a resource not matching the center resource list or the vehicle resource list is detected from among the resources described in the remote driving functions of the vehicle functional definition and the center functional definition (step ST4 "YES"), the resource comparison unit 16 selects an alternative resource for the detected non-matching resource from the alternative resource storage unit 15 (step ST5). If the non-matching resource can be switched to the alternative resource (step ST6 "YES"), the resource comparison unit 16 notifies the resource switching unit 17 of information indicating the non-matching resource and the alternative resource, and notifies the resource switching unit 17 of information indicating a matching resource. If the non-matching resource cannot be switched to the alternative resource (step ST6 "NO"), the vehicle control device 10 ends the operation illustrated in the flowchart of FIG. 13. Note that the case where the non-matching resource cannot be switched to the alternative resource is a case where the alternative resource does not exist in the alternative resource storage unit 15, a case where an operator of the vehicle remote driving apparatus 22 does not permit switching to the alternative resource, or the like.

Further, if a resource in an unusable state is detected from among the resources described in the remote driving functions of the vehicle functional definition and the center functional definition (step ST4 "YES"), the resource comparison unit 16 selects an alternative resource for the resource in the unusable state from the alternative resource storage unit 15 (step ST5). If the resource in the unusable state can be switched to the alternative resource (step ST6 "YES"), the resource comparison unit 16 notifies the resource switching unit 17 of information indicating the resource in the unusable state and the alternative resource, and notifies the vehicle control unit 18 of information indicating a resource in an effective state. If the resource in the unusable state cannot be switched to the alternative resource (step ST6 "NO"), the vehicle control device 10 ends the operation illustrated in the flowchart of FIG. 13. Note that the case where the resource in the unusable state cannot be switched to the alternative resource is a case where the alternative resource does not exist in the alternative resource storage unit 15, a case where the operator of the vehicle remote driving apparatus 22 does not permit switching to the alternative resource, or the like.

If all the resources described in the remote driving functions of the vehicle functional definition and the center functional definition match the center resource list and the vehicle resource list and are in effective states (step ST4 "NO"), the resource comparison unit 16 notifies the vehicle control unit 18 of information on the resources described in the remote driving function of the vehicle functional definition.

In step ST7, the vehicle control unit 18 controls the remotely driven vehicle 1 by acquiring remote operation information transmitted by the control center 20 via the communication unit 4, and outputting information on resources included in the remote operation information to the various actuators 3 via the resource switching unit 17. In addition, the vehicle control unit 18 acquires, from the various sensors 2 via the resource switching unit 17, information on the resources used by the control center 20 for the remote operation of the remotely driven vehicle 1, and transmits the information to the control center 20 via the communication unit 4.

At that time, the resource switching unit 17 switches the non-matching resource or the resource in the unusable state detected in step ST4 among the resources input from the various sensors 2 to the alternative resource, and outputs it to the vehicle control unit 18. In addition, the resource switching unit 17 switches the non-matching resource or the resource in the unusable state detected in step ST4 among the resources input from the vehicle control unit 18 to the alternative resource, and outputs it to the various actuators 3.

As described above, the vehicle control device 10 according to the first embodiment includes the center resource acquiring unit 11, the vehicle resource acquiring unit 12, the alternative resource storage unit 15, the resource comparison unit 16, and the resource switching unit 17. The center resource acquiring unit 11 acquires a resource list (that is, the remote driving function and the center resource list) to be used by the control center 20 to remotely operate the remotely driven vehicle 1. The vehicle resource acquiring unit 12 acquires a resource list (that is, the remote driving function and the vehicle resource list) to be used by the vehicle control unit 18 to control the remotely driven vehicle 1 in accordance with the remote operation from the control center 20. The resource comparison unit 16 compares the resource list acquired by the center resource acquiring unit 11 with the resource list acquired by the vehicle resource acquiring unit 12. The alternative resource storage unit 15 stores information on one or more alternative resources for at least one resource of the remotely driven vehicle 1. When the resource comparison unit 16 detects a resource which is not a commonality between the resource list acquired by the vehicle resource acquiring unit 12 and the resource list acquired by the center resource acquiring unit 11, the resource switching unit 17 switches the resource which is not the commonality to a corresponding one of the one or more alternative resources stored in the alternative resource storage unit 15. As a result, when the resource which the control center 20 wants and the resource of the remotely driven vehicle 1 do not match, the vehicle control device 10 can switch to the alternative resource. Therefore, even when there is a variation in the resources that can be used for the remote operation by the control center 20 and the remotely driven vehicle 1, such as when the control center 20 includes a plurality of service providers and the resources that can be used for the remote operation are different for each service provider, when a vehicle type of the remotely driven vehicle 1 is different, or when equipment of the remotely driven vehicle 1 is different, the vehicle control device 10 can control the remotely driven vehicle 1 in accordance with the remote operation from the control center 20.

Further, according to the first embodiment, the vehicle resource acquiring unit 12 acquires states of respective resources in the resource list to be used by the vehicle control unit 18 to control the remotely driven vehicle 1 in accordance with the remote operation from the control center 20. The resource comparison unit 16 detects presence or absence of a resource in an unusable state in the resource list acquired by the vehicle resource acquiring unit 12. When the resource comparison unit 16 detects the resource in the unusable state, the resource switching unit 17 switches the resource in the unusable state to a corresponding one of the one or more alternative resources stored in the alternative resource storage unit 15. As a result, even when the resource of the remotely driven vehicle 1 is unusable due to a failure or the like, the vehicle control device 10 can control the remotely driven vehicle 1 in accordance with the remote operation from the control center 20.

In addition, according to the first embodiment, the alternative resource storage unit 15 stores, for each resource of the remotely driven vehicle 1, information on a plurality of alternative resources to which respective priorities are assigned, and the resource switching unit 17 switches to one of the alternative resources which has a high priority. As a result, the vehicle control device 10 can select an alternative resource with high reliability from among the plurality of alternative resources on the basis of the priority.

Further, according to the first embodiment, the priorities assigned to the respective plurality of alternative resources are changed depending on a predetermined condition. As a result, the vehicle control device 10 can select an alternative resource with high reliability from among the plurality of alternative resources whose reliability changes depending on a condition of the outside and the like.

It is to be noted that the present disclosure can modify any component in the embodiment or omit any component in the embodiment within the scope of the disclosure.

INDUSTRIAL APPLICABILITY

Since the vehicle control device according to the present disclosure controls a vehicle in accordance with remote operation from a control center, it is suitable for use in an automated driving vehicle or the like that switches to remote driving when an occupant in a driver's seat cannot perform manual driving.

REFERENCE SIGNS LIST

1: remotely driven vehicle, 2: various sensors, 3: various actuators, 4: communication unit, 10: vehicle control device, 11: center resource acquiring unit, 12: vehicle resource acquiring unit, 13: functional definition storage unit, 14: resource list storage unit, 15: alternative resource storage unit, 16: resource comparison unit, 17: resource switching unit, 18: vehicle control unit, 20: control center, 21: communication unit, 22: vehicle remote driving apparatus, 100: processing circuit, 101: processor, 102: memory

The invention claimed is:

1. A vehicle control device to control a vehicle in accordance with remote operation from a control center, the vehicle control device comprising:
at least one processor; and
at least one memory including information on one or more alternative resources for at least one resource of the vehicle, and computer program code, when executed, causes the at least one processor to:
acquire a first resource list used by the control center to remotely operate the vehicle, wherein the first resource list is a center resource list, and wherein the first resource list further comprises a center functional definition;
acquire a second resource list used by the vehicle control device to control the vehicle in accordance with the remote operation from the control center, wherein the second resource list is a vehicle resource list, and wherein the second resource list further comprises a vehicle functional definition;
compare the first resource list acquired with the second resource list acquired;
switch, based on detecting a resource which is not a commonality between the first resource list acquired and the second resource list acquired, the resource which is not the commonality to a corresponding one of the one or more alternative resources stored in the memory;
control movement of the vehicle using the corresponding alterative resource; and wherein
acquiring the second resource list to be used by the vehicle control device to control the vehicle in accordance with the remote operation from the control center comprises acquiring the second resource list, and acquiring states of respective resources in the second resource list,
comparing the first and second resource lists includes determining presence or absence of a resource in an unusable state in the second resource list acquired, and
the switching comprises, based on detecting the resource in the unusable state, switching the resource in the unusable state to a corresponding one of the one or more alternative resources stored in the at least one memory.

2. The vehicle control device according to claim 1, wherein
the at least one memory stores, for each of the at least one resource of the vehicle, information on a plurality of alternative resources to which respective priorities are assigned, and
the switching comprises switching to one of the alternative resources based on the one of the alternative resources having a highest priority.

3. The vehicle control device according to claim 2, wherein the priorities assigned to the respective plurality of alternative resources are changed depending on a predetermined condition.

4. The vehicle control device according to claim 1, wherein comparing the first and second resource lists includes determining includes whether or not a resource described in the center functional definition is satisfied and whether or not a resource described in the vehicle functional definition is satisfied.

5. The vehicle control device according to claim 1, wherein, based on the resource which is not a commonality being vehicle speed, the alternate resource is selected from one or more of vehicle speed estimated from camera image, vehicle speed estimated from acceleration sensor, and vehicle speed estimated from vehicle position information.

6. A vehicle control method of a vehicle control device to control a vehicle in accordance with remote operation from a control center, the vehicle control method comprising:

acquiring a first resource list to be used by the control center to remotely operate the vehicle, wherein the first resource list is a center resource list, and wherein the first resource list further comprises a center functional definition;

acquiring a second resource list to be used by the vehicle control device to control the vehicle in accordance with the remote operation from the control center, wherein the second resource list is a vehicle resource list, and wherein the second resource list further comprises a vehicle functional definition;

comparing the first resource list acquired with the second resource list acquired;

referring to a memory to store information on one or more alternative resources for at least one resource of the vehicle, and thereby switching, when detecting a resource which is not a commonality between the first resource list acquired and the second resource list acquired, the resource which is not the commonality to a corresponding one of the one or more alternative resources stored in the memory;

controlling movement of the vehicle using the corresponding alternative resource; and wherein acquiring the second resource list to be used by the vehicle control device to control the vehicle in accordance with the remote operation from the control center comprises acquiring the second resource list, and acquiring states of respective resources in the second resource list, comparing the first and second resource lists includes determining presence or absence of a resource in an unusable state in the second resource list acquired, and the switching comprises, based on detecting the resource in the unusable state, switching the resource in the unusable state to a corresponding one of the one or more alternative resources stored in the at least one memory.

\* \* \* \* \*